United States Patent
Ogata et al.

(10) Patent No.: US 6,546,550 B1
(45) Date of Patent: Apr. 8, 2003

(54) METHOD TO DETERMINE DYNAMIC COMPILATION TIME AND TO SELECT BYTECODE EXECUTION MODE

(75) Inventors: Kazunori Ogata, Fujisawa (JP); Hideaki Komatsu, Yokohama (JP); Hiroshi Dohji, Zama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/492,438

(22) Filed: Jan. 27, 2000

(30) Foreign Application Priority Data

Jan. 28, 1999 (JP) ............................................. 11-019335

(51) Int. Cl.[7] ................................................ G06F 9/45
(52) U.S. Cl. ........................ 717/148; 717/150; 717/140; 717/151; 712/233; 712/234
(58) Field of Search ................................. 717/148, 150, 717/151, 153, 160, 128–132, 141, 140, 118; 712/237–241, 239, 233, 234, 235, 2; 709/1; 700/135

(56) References Cited

U.S. PATENT DOCUMENTS

| | | | | |
|---|---|---|---|---|
| 4,755,966 A | * | 7/1988 | Lee et al. ................... | 712/239 |
| 5,428,786 A | * | 6/1995 | Sites ........................... | 717/151 |
| 5,748,964 A | * | 5/1998 | Gosling ....................... | 709/100 |
| 5,768,593 A | * | 6/1998 | Walters et al. .............. | 717/141 |
| 5,881,278 A | * | 3/1999 | Tran et al. .................. | 712/242 |
| 5,887,152 A | * | 3/1999 | Tran ............................. | 712/217 |
| 5,966,538 A | * | 10/1999 | Granston et al. ............ | 717/158 |
| 5,970,249 A | * | 10/1999 | Holzle et al. ............... | 717/153 |
| 5,995,754 A | * | 11/1999 | Holzle et al. ............... | 717/158 |
| 6,118,940 A | * | 9/2000 | Alexander, III et al. .... | 717/127 |
| 6,237,141 B1 | * | 5/2001 | Holzle et al. ............... | 717/139 |
| 6,282,702 B1 | * | 8/2001 | Ungar ......................... | 717/148 |
| 6,336,213 B1 | * | 1/2002 | Beadle et al. ............... | 717/118 |
| 6,374,349 B1 | * | 4/2002 | McFarling ................... | 712/239 |
| 6,374,351 B2 | * | 4/2002 | Tremblay .................... | 712/239 |
| 6,393,549 B1 | * | 5/2002 | Tran et al. ................... | 712/204 |
| 6,397,379 B1 | * | 5/2002 | Yates, Jr. et al. ........... | 717/140 |
| 6,401,196 B1 | * | 6/2002 | Lee et al. .................... | 711/213 |

FOREIGN PATENT DOCUMENTS

JP 8-87417 4/1996

OTHER PUBLICATIONS

Title: A Dynamic Programming Technique for Compacting Loop, Vegdahl, ACM, 1992.*
Title: Improving Data–flow Analysis with path profiles, author: Ammons et al, ACM, May 1998.*
Title: Two–Level Adaptive Training Branch Prediction, author: Yeh et al, ACM, 1991.*
Title: Reducing the Branch Penalty in Pipelined Processors, author Lilja, IEEE, 1988. Title: Reducing the branch Penalty in pipelined processors, author: lilja, IEEE, 1988.*
Java World, vol. 2, No. 7, issued by IDG Communications, Col, Ltd, pp. 40–51.

* cited by examiner

*Primary Examiner*—Gregory Morse
*Assistant Examiner*—Chameli C. Das
(74) *Attorney, Agent, or Firm*—Steven W. Roth

(57) ABSTRACT

To perform efficient execution of a bytecode by combining an interpreter and a compiler. At a time of a bytecode execution by an interpreter, if an instruction to be executed is a backward conditional branch instruction, it is determined whether the backward conditional branch instruction is a back edge of a loop. And if it is determined the instruction is a back edge of a loop, the number of the loop iteration is estimated and stored into a storage. A bytecode execution mode is selected according to the estimated number of the loop iteration. This execution mode comprises the modes of immediately compiling a method including a loop, and having the interpreter execute a bytecode.

11 Claims, 2 Drawing Sheets

METHOD TO DETERMINE DYNAMIC COMPILATION TIME AND TO SELECT BYTECODE EXECUTION MODE

DETAILED DESCRIPTION OF THE INVENTION

1. Field of the Invention

The present invention relates to a method for dynamically using a compiler in executing a bytecode which is an intermediate code of Java™ (a trademark of Sun Microsystems, Inc.), Smalltalk, and the like.

2. Background of the Invention

Conventionally, in a bytecode interpreter of a virtual machine in Java™, Smalltalk, and the like, optimization is often performed by compiling (at execution time) those bytecodes which are frequently executed. This optimization is achieved by determining the frequency that each method is called and comparing the results to a threshold value. Only those methods with call frequencies that exceed the threshold are compiled, saving overall compilation time.

However, in the above-mentioned conventional method, frequency of calling a method is a trigger for compilation; therefore, even if a loop whose iteration number is huge is included in a method, it is not selected for compilation

SUMMARY OF THE INVENTION

An object of the present invention is to solve the above-mentioned problem and detect a method including a loop and estimate an effect of compiling the method at a low cost at an execution time so as to provide a method for a more efficient bytecode execution by selecting an execution mode according to the estimation.

Another object of the present invention is to provide a method for enabling more efficient processing of an interpreter and a compiler by recording an execution history of a conditional branch instruction and the like simultaneously with detection of a loop.

In the method for determining a dynamic compilation time which is the first form of the present invention, first, at a time of a bytecode execution by an interpreter, if an instruction to be executed is a backward conditional branch instruction, it is determined whether the backward conditional branch instruction is a back edge of a loop. And if it is determined the instruction is a back edge of a loop, the number of the loop iteration is estimated and stored into a storage. The time of compilation is determined according to the estimated number of the loop iteration.

In the method for selecting a bytecode execution mode which is the second form of the present invention, first, at a time of a bytecode execution by an interpreter, if an instruction to be executed is a backward conditional branch instruction, it is determined whether the backward conditional branch instruction is a back edge of a loop. And if it is determined the instruction is a back edge of a loop, the number of the loop iteration is estimated and stored into a storage. A bytecode execution mode is selected according to the estimated number of the loop iteration.

In a suitable form of embodiment, an execution mode comprises the modes of immediately compiling a method including a loop; and having the interpreter execute a bytecode. In a further suitable form of embodiment, the mode of immediately compiling a method including a loop comprises a predetermined number of modes whose optimization levels were changed according to the estimated number of the loop iteration. It is also possible, in the mode of having the interpreter execute a bytecode, to organize it so that the time of compiling a method including a loop is determined according to the estimated number of the loop iteration.

Determination in the first and second forms of the present invention, of whether the backward conditional branch instruction is a back edge of a loop, is suitably performed by pattern matching using state transition of a bytecode sequence comprised of a predetermined number of instructions prior to the conditional branch instruction and a bytecode sequence corresponding to an actual back edge of a loop. In addition, suitably, the number of the loop iteration is estimated from operands of a predetermined number of instructions prior to the conditional branch instruction. More suitably, an operation code of the conditional branch instruction which determined whether the instruction is a back edge of a loop is modified to indicate that it is already determined and/or whether a conditional branch has been taken.

While a flow of processing of the present invention is explained as above, the present invention can also be implemented by a device for implementing these processes or in a form of a program for having a computer implement these processes. Storing of this program on storage media such as a floppy disk, CD-ROM, or any other form of storage is well understood by one having ordinary skill in the art.

DETAILED DESCRIPTION

Figure 2:
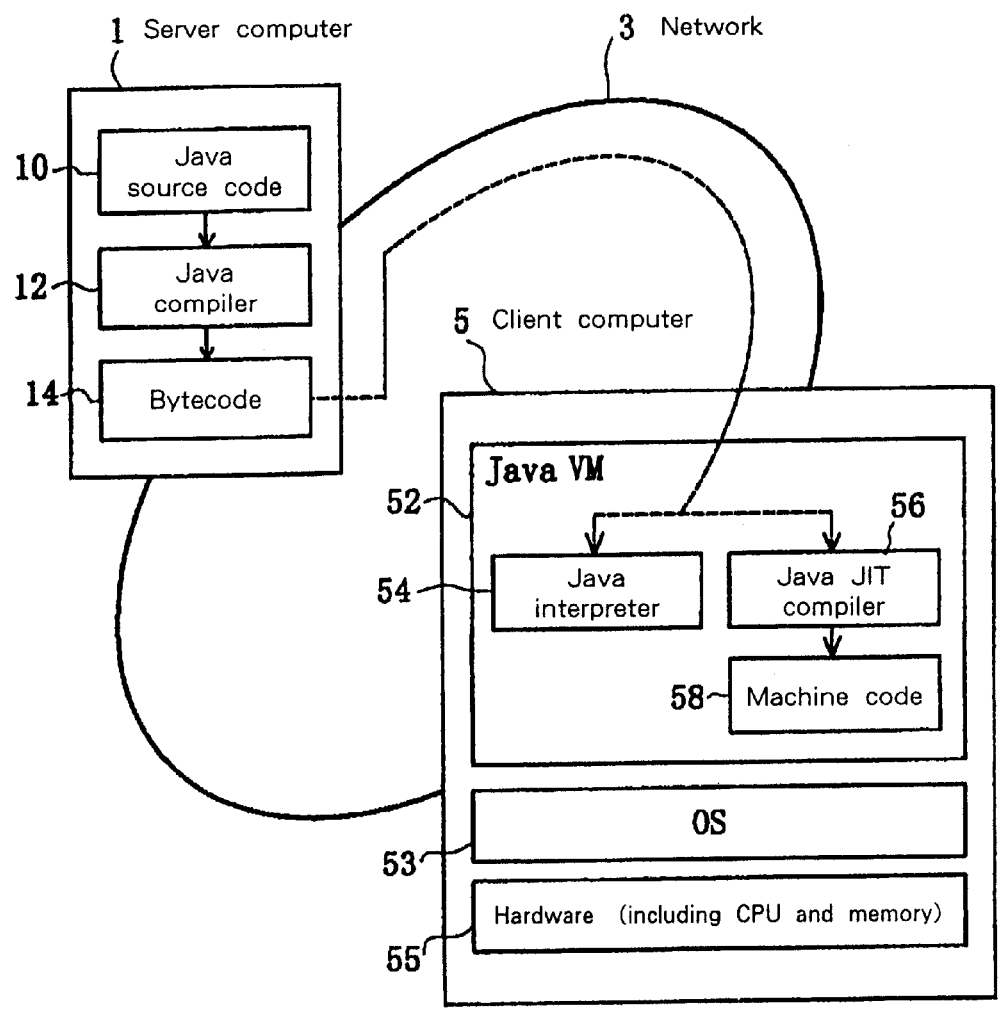
FIG. 2 is a drawing showing an example of device configuration of the present invention.

Device configuration of the present invention is described by using FIG. 2. Server computer 1 and client computer 5 are connected via network 3. Client computer 5 comprises Java™ VM (virtual machine) 52, OS (operating system) 53, and hardware (including CPU and memory) 55. Moreover, Java™ VM 52 comprises Java™ interpreter 54 and Java™ JIT compiler 56. Meanwhile, client computer 5 may be, other than an ordinary computer, a so-called network computer or a home information appliance which has a smaller size of memory or does not include any auxiliary storage such as a hard disk.

On server computer 1, Java™ source code 10 is compiled by Java™ compiler 12 (sometimes described as Java™ bytecode compiler or Java™c). The result of this compilation is bytecode 14. This bytecode 14 is sent to client computer 5 via network 3. Bytecode 14 is a native code for Java™ Virtual Machine (Java™ VM) 52 installed on a WWW browser (World Wide Web Browser) in client computer 5, etc., and Java™ interpreter 54 or Java™ JIT compiler 56 is used when actually executed on the CPU of hardware 55. Interpreter 54 decodes bytecode 14 at an execution time and invokes and executes an interpretation routine prepared for each instruction. On the other hand, JIT compiler 56 translates a bytecode to machine code 58 (also referred to as a machine language code) by using a compiler in advance or immediately before execution and then executes it on the CPU. The present invention relates to JIT compiler 56 and interpreter 54.

Figure 1:
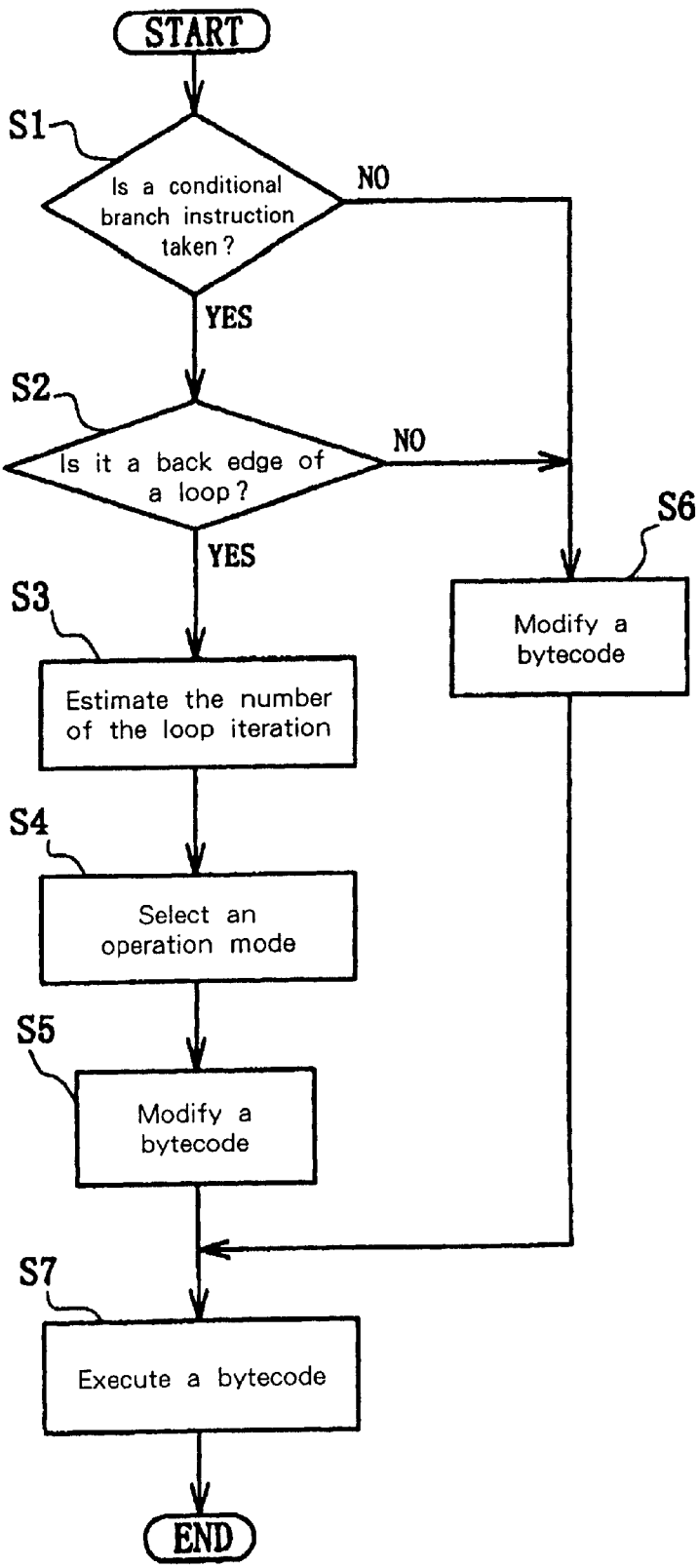
FIG. 1 is a flowchart showing an example of a method for selecting a bytecode for performing a dynamic compilation of the present invention.

FIG. 1 is a flowchart showing an example of processing related to an interpreter and a compiler of the present invention. To describe the present invention according to FIG. 1, first, at a time of a bytecode execution by a bytecode interpreter of Java™, Smalltalk, and the like, it is determined if an instruction to be executed is a backward conditional branch instruction and if it is taken (S1), and it is determined whether a backward conditional branch instruction is a back edge of a loop each time a backward conditional branch instruction is taken (S2). And if it is consequently determined the instruction is a back edge of a loop, the number of the loop iteration is estimated (S3). And thereafter, a bytecode execution mode, namely an operation mode of the interpreter and the compiler is selected according to the estimated number of the loop iteration (S4). And an operation code of the conditional branch instruction is modified so as not to identify a loop many times (S5). Lastly, a bytecode is executed according to the execution mode selected in step S4 (S7). On the other hand, if a conditional branch instruction is not taken in step S1 or if it is determined that it is not a back edge of a loop in step S2, the bytecode is also executed (S7) after an operation code of the conditional branch instruction is modified so as not to identify a loop many times (S6).

The following describes identification of a loop (corresponding to steps S1, S2, and S3) and change of an operation mode (corresponding to step S4), and also explains modification of a bytecode as a suitable form of embodiment.

1.1: Identification of a Loop

The following process is performed in order to identify an internal loop of a bytecode.

1. When a backward conditional branch instruction is actually taken during processing of a bytecode, a pattern matching is performed by using state transition of several immediately preceding instructions and a bytecode instruction sequence corresponding to a back edge of a loop generated by, for instance, Java™ bytecode compiler. This pattern matching does not have to be complete, and it just has to verify a possibility of being a loop in as short a processing time as possible. For instance, a back edge of a loop described as follows in the Java™ language for (i=0; i<1000; i++) {(a process in a loop)} becomes a bytecode sequence as follows:

| address | bytecode | |
|---|---|---|
| 5 | (head of a loop) | |
| ... | (a process in a loop) | |
| 17 | iinc 0 1 | /*increase variable i by 1*/ |
| 20 | iload_0 | /*variable i to a stack*/ |

-continued

| address | bytecode | |
|---|---|---|
| 21 | sipush 1000 | /*1000 to a stack*/ |
| 24 | if_icmplt 5 | /*in the case of (i<1000), to address 5*/ |

There are several types of patterns of such a bytecode sequence according to description of a loop on a source code. They are detected by performing pattern matching backward from a conditional branch instruction so as to promptly determine whether it is a loop. If a bytecode once determined to be a loop turns out not to be a loop in fact, as mentioned later, an error code is returned from JIT compiler and, in this case, it can be executed by an interpreter.

2. If a possibility of being a loop is high, the number of the loop iteration from now on is estimated from operands of bytecodes. This should also be estimated in as short a time as possible. In the above-mentioned example, the number of the loop iteration can be estimated as 999 times from second operand (1) of iinc, operand (1000) of sipush and the current value of i. In the case of branching forward, in the case that a branch instruction is not taken, and in the case that it does not match any pattern, modification of a bytecode mentioned later in section 1.3 is implemented. Moreover, the estimated number of the loop iteration is stored in memory.

1.2: Change of an Operation Mode

An operation mode from now on is determined according to the number of the loop iteration estimated as above. For instance, if an estimated number of the loop iteration is n, and the threshold values for changing an operation mode are N1<N2<N3<N4, an operation mode is changed as follows:

(1) If n≦N1, nothing is done, and it is compiled according to the number of method calls.

(2) If N1<n≦N2, a variable holding the number of method calls are manipulated so as to be compiled with fewer method calls than usual.

(3) If N2<n≦N3, a variable holding the number of method calls are manipulated so as to be compiled with a next method call.

(4) If N3<n≦N4, a hot spot compilation is immediately performed, and if possible, it is executed with a compiled code from a next iteration of the loop.

(5) If N4<n, a hot spot compilation is immediately performed at a higher optimization level, and if possible, it is executed with a compiled code from a next iteration of the loop.

As above, as to (1) to (4), a compilation timing is either determined or adjusted. In (5), two or more optimization levels may be determined.

A "hot spot compilation" referred to here is to create a code, in addition to an ordinary compilation, which has an entry point from the head of this loop. JIT compiler creates an entry point to the head of a method by compiling the entire method, and additionally creates a code for entering at the head of a designated loop and returns it to an interpreter. At this time, if the designated part turns out not to be a loop, JIT compiler returns an error code to the interpreter. In response to a return code from JIT compiler, the interpreter executes with a compiled code from a next iteration if a hot spot compilation is successful. If not, it is executed by the interpreter.

1.3: Modification of a Bytecode

Since a loop does not need to be checked twice, a bytecode instruction already checked should be modified to be a bytecode instruction not to check. At this time, it is also possible to modify it to be a different instruction depending on whether a conditional branch was taken or not taken in order to help optimization of JIT compiler. In the above example, a bytecode of if_icmplt is modified to be "if_icmplt_taken" or "if_icmplt_nottaken" which is defined by using an unused bytecode. JIT compiler can generate an optimized code by using this dynamic information. In addition, even if this conditional branch instruction is executed again with an interpreter, it can handle it with an interpretation routine optimized to whether it was taken or not taken respectively.

The following explains an actual example, namely a case where the present invention is incorporated in Java™ interpreter/JIT compiler. In other words, while there are several methods for composing a loop in the Java™ language, for, while, do while are of high frequency of occurrence. Here it is explained by taking an example of Java™ bytecode compiler (Java™c) which is incorporated in a JDK (Java™ Development Kit) of Sun Mircosystems, Inc.

2.1: Identification of a Loop and Estimation of the Number of the Loop Iteration Of loop control structures describable in the Java™ language, the following is covered as one which is identifiable as to whether a loop or not at a low cost, predictable as to the number of the loop iteration, and frequently used in general:

Structure:

for((process0));(condition);(increase and decrease of loop variable))
{
  (process 1)
} and (increase and decrease of a loop variable) ends by
* increasing or decreasing a loop variable by a value of a constant such as i++, i−+2,
and
(condition) is
* a comparison of a loop variable and a constant such as i<1000, i!=0,
* a comparison of a loop variable and a variable not changeable in a loop such as i<j, i!=j,
and
* a comparison of a loop variable and a static value or a field value such as i<m i<this.m.

Even loops described in a while sentence and a do-while sentence are covered as long as represented in the above form A back edge of such a loop is compiled as a bytecode shown in the following Table 1, if (condition) is a comparison with 0 according to Java™c. Here, boldface is an operation code, and opr means operand.

TABLE 1

| | | | | | |
|---|---|---|---|---|---|
| type 1 | | iinc | opr | opr | iload_x | ifxx |
| type 2 | iinc | opr | opr | iload | opr | ifxx |

A bytecode shown in Table 1 can be identified by using state transition as shown in Appendix.A in the following Table 2.

TABLE 2

Appendix.A
Notation used in the following is described.

| | |
|---|---|
| (state X) | : Name of state. |
| {.....} | : What is known when transitioned to the state. |
| look-ahead pc[−x] | : Check a bytecode of x byte before a conditional branch instruction. |
| opcode1: | : If a result of look-ahead pc[−x] is opcode1, process the right of:. |
| <verify type x> ? (state X) : (state Y) | |
| | : Verify simply whether an instruction pattern is type x of a bytecode pattern, and if OK, transit to (state X), and if not, transit to (state Y). |
| (state 0) { } : look-ahead pc [−1] | |
| iload_x: | <verify type 1> ? (is type 1) : (state 1) |
| others: | (state 1) |
| (state 1) {pc[−1] != opcode} : look-ahead pc[−2] | |
| iload: | <verify type 2> ? (is type 2) : (not a loop) |
| others: | (not a loop) |

On the other hand, if (condition) is a comparison with anything other than 0, the above-mentioned back edge of a loop is compiled by a Java™c as a bytecode shown in Table 3 below.

TABLE 3

| | | | | | | | | |
|---|---|---|---|---|---|---|---|---|
| type 1 | | | iinc | opr | opr | iload_x | bipush | opr | if_xx |
| type 2 | | iinc | opr | opr | iload | opr | bipush | opr | if_xx |
| type 3 | | iinc | opr | opr | iload_x | sipush | opr | opr | if_xx |
| type 4 | iinc | opr | opr | iload | opr | sipush | opr | opr | if_xx |
| type 5 | | | iinc | opr | opr | iload_x | ldc_quick | opr | if_xx |
| type 6 | | iinc | opr | opr | iload | opr | ldc_quick | opr | if_xx |
| type 7 | | iinc | opr | opr | iload_x | ldc_w_quick | opr | opr | if_xx |
| type 8 | iinc | opr | opr | iload | opr | ldc_w_quick | opr | opr | if_xx |
| type 9 | | | iinc | opr | opr | iload_x | iload_y | if_xx |
| type 10 | | | iinc | opr | opr | iload | opr | iload_y | if_xx |
| type 11 | | | iinc | opr | opr | iload_x | iload | opr | if_xx |
| type 12 | | iinc | opr | opr | iload | opr | iload | opr | if_xx |
| type 13 | | iinc | opr | opr | iload_x | getstatic_quick | opr | opr | if_xx |
| type 14 | iinc | opr | opr | iload | opr | getstatic_quick | opr | opr | if_xx |
| type 15 | | iinc | opr | opr | iload_x | aload_0 | getfield_quick | opr | opr | if_xx |
| type 16 | iinc | opr | opr | iload | opr | aload_0 | getfield_quick | opr | opr | if_xx |

A bytecode shown in Table 3 certainly has an operation code two to three bytes before if_xx, so they can be identified by using state transition as shown in Appendix.B in the following Table 4.

TABLE 4

Appendix.B
See Appendix.A as to notation used in the following.

(state 0) { } : look-ahead pc [−2]
    bipush:    (state 1)
    ldc_quick:    (state 3)
    iload_x:    <verify type 9> ? (is type 9) : (state 7)
    iload:    (state 5)
    others:    (state 7)
(state 1) {pc[−2] = bipush} : look-ahead pc[−3]
    iload_x:    <verify type 1> ? (is type 1) : (state 2)
    others:    (state 2)
(state 2) {pc[−2] =bipush,pc[−3]!=opcode}:look-ahead pc [−4]
    iload:    <verify type 2> ? (is type 2) : (state 7)
    others:    (state 7)
(state 3) {pc[−2] = ldc_quick} : look-ahead pc[−3]
    iload_x:    <verify type 5> ? (is type 5) : (state 4)
    others:    (state 4)
(state 4) {pc[−2] = ldc_quick,pc[−3] ! = opcode} : look-ahead pc[−4]
    iload:    <verify type 6> ? (is type 6) : (state 7)
    others:    (state 7)
(state 5) {pc[−2] − iload} : look-ahead pc[−3]
    iload_x:    <verify type 11> ? (is type 11) : (state 6)
    others:    (state 6)
(state 6) {pc[−2] = iload,pc[−3] ! = opcode} : look-ahead pc[−4]
    iload:    <verify type 12> ? (is type 12) : (state 7)
    other:    (state 7)
(state 7) {pc[−2]! = opcode} : look-ahead pc[−3]
    sipush:    (state 8)
    ldc_w_quick:    (state 10)
    iload:    <verify type 10> ? (is type 10) : (not a loop)
    getstatic_quick:    (state 12)
    getfield_quick:    (state 14)
    others:    (not a loop)
(state 8) {pc[−3] = sipush} : look-ahead pc[−4]
    iload_x:    <verify type 3> ? (is type 3) : (state 9)
    others:    (state 9)
(state 9) {pc[−3] = sipush,pc[−4]! = opcode} : look-ahead pc[−5]
    iload:    <verify type 4> ? (is type 4) : (not a loop)
    others:    (not a loop)
(state 10) {pc[−3] = ldc_w_quick} : look-ahead pc[−4]
    iload_x:    <verify type 7> ? (is type 7) : (state 11)
    others:    (state 11)
(state 11) {pc[−3] = ldc_w_quick,pc[4]! = opcode} : look-ahead pc[−5]
    iload:    <verify type 8> ? (is type 8) : (not a loop)
    others:    (not a loop)
(state 12) {pc[−3] = getstatic_quick} : look-ahead pc[−4]
    iload_x:    <verify type 13> ? (is type 13) : (state 13)
    others:    (state 13)
(state 13) {pc[−3] = getstatic_quick,pc[−4]! = opcode} : look-ahead pc[−5]
    iload:    <verify type 14> ? (is type 14) : (not a loop)
    others:    (not a loop)
(state 14) {pc[−3] = getfield_quick} : look-ahead pc[−5]
    iload_x:    <verify type 15> ? (is type 15) : (state 15)
    others:    (state 15)
(state 15) {pc[−3] = getfield_quick,pc[−5]! = opcode} : look-ahead pc[−6]
    iload:    <verify type 16> ? (is type 16) : (not a loop)
    others:    (not a loop)

If it is found that a possibility of being a loop is high, the number of the loop iteration is estimated next. For instance, in the case of type 3 in the above example, it is easily acquired by taking an increment of a loop variable from an operand of iinc, the current value of a loop variable held by a local variable from an operand of iload_x, and a value to be compared with a loop variable from an operand of sipush. Moreover, if it matches a pattern up to immediately before iinc instruction, it is found likely to be a back edge of a loop though the number of the loop iteration cannot be estimated. So, as a default operation, for instance, a variable holding the number of method calls is manipulated so that this method will be compiled when it is called next time.

2.2: Overhead in a Branch Instruction with No Possibility of Being a Back Edge

In the case of Pentium (a trademark of Intel Corp.), an interpretation routine of if_icmplt before adopting the present invention is as shown in Appendix.C in the following Table 5, and it takes nine cycles if a condition is taken and five cycles if not taken. As opposed to this, an interpretation routine of if_icmplt after adopting the present invention is as shown in Appendix.D in the following Table 6, and it takes ten cycles if a forward conditional branch is taken and five cycles if not taken. Consequently, it is clear that, if the present invention is adopted, it takes overhead of only one cycle at a time of a forward conditional branch.

TABLE 5

Appendix.C
An interpretation routine of if_icmplt and execute cycles on a Pentium processor before adopting the present invention are as follows.

```
entry_if_icmplt:
;   cycle-1
    cmp edx,eax                         ; Compare v1 and v2
    jge SHORT if_icmple_not_tken
                                        ; If v1 >= v2, the condition
                                        ; is not taken
;   if_icmplt_taken:                    ; (A process when a condition
                                        ; is taken)
;   cycle-2
    mov ch,BYTE PTR [esi+1]             ; ch = a first operand of
                                        ; if_icmplt
;   cycle-3
    mov cl,BYTE PTR [esi+2]             ; cl = a second operand of
                                        ; if_icmplt
;   cycle-4
    shl ecx, 16
;   cycle-5
    sar ecx, 16                         ; ecx = a branch offset
;   cycle-6
    mov ebx,DWORD PTR [esi+ecs-1]       ; Load a word including
                                        ; a next bytecode.
;   cycle-7
    and ebx, 0000FF00H                  ; Mask leaving an operation
                                        ; code.
    add esi, ecx                        ; Update bytecode program
                                        ; counter.
;   cycle-8
    add ebx, L0_HandlerStart_           ; Calculate an address of a
                                        ; next bytecode
                                        ; interpretation routine.
;   cycle-9
    jmp ebx                             ; Jump to a next bytecode
                                        ; interpretation routine.
    if_icmplet_not_taken:               ; (A process when a condition
                                        ; is not taken)
;   cycle-2
    mov ebx,DWORD PTR [esi+3-1]         ; Load a word including a
                                        ; next bytecode.
;   cycle-3
    and ebx,0000FF00H                   ; Mask leaving an operation
                                        ; code.
    add esi,3                           ; Update bytecode program
                                        ; counter.
;   cycle-4
    add ebx,L0_HandlerStart_            ; Calculate an address of a
                                        ; next bytecode
                                        ; interpretation routine.
;   cycle-5
    jmp ebx                             ; Jump to a next bytecode
                                        ; interpretation routine.
```

TABLE 6

Appendix.D
An interpretation routine of if_icmplt and execute cycles on a Pentium
processor after adopting the present invention are as follows.
Boldface means the increased process because of the present invention.

```
entry_if_icmple:
        cmp       edx,eax                       ; Compare v1 and v2.
        jge       SHORT if_icmplt_not_taken     ; If v1 >= v2, the
                                                ; condition is not taken.
if_icmplt_taken:                                ; (A process when a condition
                                                ; is taken.
;       cycle-2
        mov       cb,BYTE PTR [esi+1]           ; cb = a first operand of
                                                ; if_icmplt
;       cycle-3
        mov       cl,BYTE PTR (esi+2]           ; cl = a second operand of
                                                ; if_icmplt
;       cycle-4
        shl       ecx, 16
;       cycle-5
        sar       ecx, 16                       ; ecx = a branch offset
;       cycle-6
        cmp       ecx, 0
        jl        SHORT if_icmplt_taken_backward  ; If a backward
                                                  ; conditional branch, to a back
                                                  ; edge identification.
        if_icmplt_not_loop:
        if_icmplt_taken_forward:                ; (A process at a forward
                                                ; conditional branch)
;       cycle-7
        mov       ebx,DWORD PTR [esi+ecs-1]     ; Load a word including a
                                                ; next bytecode.
;       cycle-8
        and       ebx, 0000FF00H                ; Mask leaving an operation
                                                ; code.
        mov       BYTE PTR [exi],if_icmplt_quick_taken
                                                ; Modify a bytecode.
;       cycle-9
        add       esi,ecx                       ; Update bytecode program
                                                ; counter.
        add       ebx,L0_HandlerStart_          ; Calculate an address of a
                                                ; next bytecode
                                                ; interpretation routine.
;       cycle-10
        jmp       ebx                           ; Jump to a next bytecode
                                                ; interpretation routine.
        if_icmplt_not_taken:                    ; (A process when a condition
                                                ; is not taken)
        cycle-2
        mov       ebx,DWORD PTR (esi+3-1]       ; Load a word including a
                                                ; next bytecode.
;       cycle-3
        and       ebx, 0000FF00H                ; Mask leaving an operation
                                                ; code.
        mov       BYTE PTR [esi],if_icmplt_quick_nottaken
                                                ; Modify a bytecode.
;       cycle-4
        add       esi,3                         ; Update bytecode program
                                                ; counter.
        add       ebx,L0_HandlerStart_          ; Calculate an address of a
                                                ; next bytecode
                                                ; interpretation routine.
;       cycle-5
        jmp       ebx                           ; Jump to a next bytecode
                                                ; interpretation routine.
        ic_icmplt_taken_backward:               ; (A process at a backward
                                                ; conditional branch)
;       cycle-7
        call      check_backedge                ; Check if it is a back edge
                                                ; of a loop.
;       cycle-8
        test      eax,eax                       ; eax = the estimated number
                                                ; of the loop iteration.
        jz        SHORT if_icmplt_not_loop      ; Continue processing
                                                ; since it is not a back edge
                                                ; of a loop.
;       cycle 9
        mov       BYTE PTR [esi],if_icmplt_quick_taken
                                                ; Modify a bytecode.
```

TABLE 6-continued

Appendix.D
An interpretation routine of if_icmplt and execute cycles on a Pentium
processor after adopting the present invention are as follows.
Boldface means the increased process because of the present invention.

|   | push | eax |   | ; Post the estimated number ; of the loop iteration to a ; compiler. |
|---|---|---|---|---|
| ; | cycle-10 call do_hotspot_compilation |   |   | ; Attempt a hot spot ; compilation. |
| ; | cycle-11 test | eax,eax |   | ; eax = a return code from ; JIT compiler. |
|   | jz | SHORT if_icmplt_not_loop |   | ; Continue processing ; since it is not a back edge |
| ; | cycle-12 jmp | goto_compiled_code |   | ; To a compiled code. |

It is call check_backedge (check if it is a back edge of a loop) of cycle-7 in if_icmplt_taken_backward: (a process at a backward conditional branch) that should be noted here. This process not only checks whether it is a back edge of a loop but also includes a process of manipulating a variable holding the number of method calls in (2) and (3) of 1.2 Change of an Operation Mode. Moreover, as shown in cycle-8, the estimated number of the loop iteration is stored in a storage.

Advantages of the Invention

As it is clear from the above description, according to the present invention, detection of a method including a loop and estimation of an effect of compiling the method are performed at an execution time, and an execution mode is selected based on the estimation so as to allow processing speed to be significantly increased. In addition, if it is organized so that an execution history of a conditional branch instruction is recorded, optimization of a compiler is also facilitated.

DESCRIPTION OF THE SYMBOLS

| 1: | Server computer |
|---|---|
| 3: | Network |
| 5: | Client computer |
| 10: | Java ™ source code |
| 12: | Java ™ compiler |
| 14: | Bytecode |
| 52: | Java ™ VM |
| 54: | Java ™ interpreter |
| 56: | Java ™ JIT compiler |
| 58: | Machine code |
| 60: | Garbage collector |
| 53: | OS |
| 55: | Hardware (including CPU and memory) |

What is claimed is:

1. A method for selecting a bytecode execution mode when interpreting a bytecode, said method comprising the steps of:

determining whether an instruction to be executed is a backward conditional branch instruction by pattern matching using state transition of a bytecode sequence comprised of a predetermined number of instructions prior to said conditional branch instruction and a bytecode sequence corresponding to an actual back edge of a loop;

estimating and storing a number of the loop iterations when it is determined said instruction is a back edge of a loop; and selecting a bytecode execution mode through use of said number of the loop iterations.

2. The method for selecting a bytecode execution mode of claim 1 wherein said execution mode comprises the modes of:

immediately compiling a method including a loop; and
   having said interpreter execute a bytecode.

3. The method for selecting a bytecode execution mode of claim 2 wherein said step of immediately compiling a method including a loop comprises a predetermined number of modes whose optimization levels are changed according to said number of the loop iterations.

4. The method for selecting a bytecode execution mode of claim 2 wherein said step of having said interpreter execute a bytecode further comprises determining a time of compiling of a method that includes a loop, said determining a time of compilation being accomplished through the use of said number of the loop iterations.

5. The method for selecting a bytecode execution mode of claim 1 wherein said number of the loop iterations is estimated from operands of a predetermined number of instructions prior to said conditional branch instruction.

6. The method for selecting a bytecode execution mode of claim 1 wherein an operation code of said conditional branch instruction which determined whether said instruction is a back edge of a loop is modified to indicate that it is already determined.

7. The method for selecting a bytecode execution mode of claim 1 wherein an operation code of said conditional branch instruction which determined whether said instruction is a back edge of a loop is modified to indicate whether a conditional branch was taken.

8. A computer comprising an interpreter and a compiler, said interpreter being configured to perform the steps of:

determining at a time of a bytecode execution whether an instruction to be executed is a backward conditional branch instruction;

determining whether said backward conditional branch instruction is a back edge of a loop by pattern matching using state transition of a bytecode sequence comprised of a predetermined number of instructions prior to said conditional branch instruction and a bytecode sequence corresponding to an actual back edge of a loop;

estimating and storing a number of loop iterations if it is determined that said instruction is a back edge of a loop; and selecting a bytecode execution mode through use of said number of the loop iterations.

9. A computer, said computer comprising:

an interpreter, said interpreter comprising, means for determining at a time of a bytecode execution whether an instruction to be executed is a backward conditional branch instruction;

means for determining whether said backward conditional branch instruction is a back edge of a loop by pattern matching using state transition of a bytecode sequence comprised of a predetermined number of instructions prior to said conditional branch instruction and a bytecode sequence corresponding to an actual back edge of a loop;

means for estimating and storing a number of loop iterations if it is determined said instruction is a back edge of a loop; and means for selecting a bytecode execution mode through use of said number of the loop iterations.

10. A storage medium storing an interpreter, said interpreter being configured to perform the steps of:

determining at a time of a bytecode execution whether an instruction to be executed is a backward conditional branch instruction;

determining whether said backward conditional branch instruction is a back edge of a loop by pattern matching using state transition of a bytecode sequence comprised of a predetermined number of instructions prior to said conditional branch instruction and a bytecode sequence corresponding to an actual back edge of a loop;

estimating and storing a number of loop iterations if it is determined said instruction is a back edge of a loop; and selecting a bytecode execution mode through use of said number of the loop iterations.

11. A storage medium storing a program, said program being configured to perform the steps of:

determining at a time of a bytecode execution if an instruction to be executed is a backward conditional branch instruction;

determining whether said backward conditional branch instruction is a back edge of a loop by pattern matching using state transition of a bytecode sequence comprised of a predetermined number of instructions prior to said conditional branch instruction and a bytecode sequence corresponding to an actual back edge of a loop;

estimating and storing a number of the loop iterations if it is determined said instruction is a back edge of a loop; and selecting a bytecode execution mode through use of said number of the loop iterations.

* * * * *